United States Patent Office 3,114,719
Patented Dec. 17, 1963

3,114,719
PYROPHORIC METAL CATALYSTS FOR OLEFIN POLYMERIZATION
Robert S. Aries, New York, N.Y.
(76 Ave. Paul Doumer, Paris 16, France)
No Drawing. Filed Aug. 27, 1956, Ser. No. 606,207
7 Claims. (Cl. 252—430)

The present invention is directed to novel catalytic systems for polymerizing ethylene and other vinyl-type monomers under particularly favorable conditions to yield products of high molecular weight which have properties superior to those heretofore known for the polymers of these same monomers.

In principle, these catalytically active systems consist of two components, one of them being a pyrophoric, easily oxidizable material having a high ratio of surface to weight or volume which is suspended in the monomer or in an inert liquid, the other component being a metal hydride or a metal organic compound capable of complexing with the aforesaid easily oxidizable material, such as metal alkyls, aryls, or Grignard reagents.

The polymerization of ethylene was first successfully carried out in the bulk phase at pressures of several hundred amtospheres and at temperatures around 200° C.; products obtained by this method are known as high pressure polyethylenes. They represent a plastic material with a greasy touch having a melting point of about 110° C. and a specific gravity of about 0.92. From the point of view of molecular structure these products consist of macromolecules having number average molecular weights of about 25,000, weight average molecular weights of about 200,000 and possessing many short and a few long branches.

Recently several investigators have discovered methods of polymerizing ethylene under much milder conditions with new types of catalytically active systems. Specifically the Phillips Petroleum Company has disclosed the use of solid $Al_2O_3$—$Cr_2O_3$—$SiO_2$ catalysts at pressures up to 100 atmospheres and temperatures up to 150° C., the Standard Oil Company of Indiana has disclosed the use amongst others of certain activated molybdenum oxides supported on carriers, and Professor Karl Ziegler has discovered that certain combinations of metal halides and metalalkyls polymerize ethylene even at room temperature and atmospheric pressure.

My own investigations in this field have elucidated the nature of the catalytically-active principle involved and have added a novel type of efficient combinations of catalytically active materials hitherto unknown. In the course of these studies I prepared $TiCl_2$ and $TiCl_3$ in many different ways in the form of fine crystalline powders and combined them with metal hydride or metalalkyl type compounds to form novel types of extremely reactive and efficient polymerization catalysts. Both these lower chlorides of Ti are very sensitive to oxygen and, as a consequence, are pyrophoric if they are exposed in the form of a fine powder to air or oxygen. While experimenting with these materials and carrying out numerous polymerization experiments with ethylene and other vinyl-type monomers I noticed that sometimes the lower halides of Ti were only mildly pyrophoric and reacted only partly, if at all, when exposed to air. In all such cases the combinations of these lower halides with metalalkyl were either not at all active or only to a very small extent. On the other hand pyrophoric speciments always gave highly reactive combinations. This behavior aroused my interest and I established the validity of the effectiveness as measured by pyrophoric activity by a series of special experiments in which the pyrophoric activity of $TiCl_2$ and $TiCl_3$ was destroyed or diminished by a large particle size of the powder or by the action of mercury, iodine and sulfur compounds on a finely divided suspension of these lower lower halides. The consistent high activity of the pyrophoric preparations of the lower halides of Ti suggested to me the idea that other materials chemically different from these lower halides might also prove to be efficient components provided they are pyrophoric and have a certain capacity to form complexes with the metal hydride or metalalkyl type components of the catalytically active system. I immediately tested this hypothesis by combining pyrophoric iron having a high ratio of surface to volume as one component together with diethylzinc as the other ingredient and found surprisingly enough that a combination of these two materials in an inert solvent is a very efficient catalyst for the polymerization of ethylene at atmospheric pressure and room temperature. Then I proceeded to test several other pyrophoric metals which I prepared by different methods and established the fact that each of them could be rendered catalytically active for vinyl-type polymerizations by the addition of a soluble metal hydride or metal alkyl to polymerize ethylene and other vinyl-type monomers under unusually mild conditions to high molecular weight compounds with valuable mechanical, thermal and electrical properties.

The pyrophoric materials in accordance with the present invention should have at least about 25 square meters of effective surface per gram and constitute one or more metals which are "multivalent," i.e., capable of existing in a plurality of valence states, such as iron, nickel, cobalt, platinum, titanium, lead, cerium, uranium, thorium, zirconium, chromium, and the like. Preferably, each gram of active metal has an effective surface of at least 30 square meters. The effective surface of the metal is determined by the amount of gas which will be absorbed by the metal and the effective surface will generally be far greater than the apparent surface due to the presence of large pores, fissures, and numerous surface irregularities within the metal as a result of the manner in which it is produced.

The metals with the large effective surfaces herein indicated can be prepared in several different ways. A first method of preparing such metals involves the reduction of oxides of the multivalent metals or salts thereof with inorganic acids such as nitric, sulfuric or carbonic acids, or with organic acids such as oxalates, citrates, tartrates, or others which leave no residue. The reduction can be effected by contact of the metallic compound in very finely divided form, i.e., less than 50 micron particles, with hydrogen.

In addition to the small particle size, however, the reduction should be carried out in a manner which will not destroy the pyrophorosity of the end product. In Thorpe's Dictionary of Applied Chemistry, 4th edition, vol. X, p. 327, a process for preparing pyrophoric metals is described in detail. The hydrogenation temperature must be conrtolled since cobalt for example is pyrophoric when reduced at 400° C. but is not pyrophoric if reduced at 600° C. This may be due to a sintering or agglomeration of the particles at elevated temperatures and it is apparent that the pyrophorosity is not due solely to the particle size of the material.

As a matter of fact, although cobalt obtained by reduction at 870° C. is not at all pyrophoric, if the cobalt compound is first mixed with alumina and then reduced, the end product is highly pyrophoric.

This represents another method of obtaining the desired large surface area, viz, through use of a porous carrier having the requisite ratio of surface area to volume or weight. By depositing a unimolecular layer of metal over all exposed surfaces of the carrier, including cracks and fissures, the effective surface of the metal actually is even greater than that of the carrier per unit weight and the requisite property will result. The carrier can be alumina, silica, various other metal oxides, carbon, or the like, so long as these carriers are in a form where the layer of metal carried thereon has an effective surface of at least 25 square meters per gram. As an approximation the effective surface of the carrier can be taken as the effective surface of the metal held thereon whereas the metal will actually have an even higher effective surface ratio.

Still another method for obtaining metals having the desired high ratio of surface to weight involves dissolution of one metal from an alloy whereby the remaining metal is left in a porous or open attenuated form having the desired ratio of surface to weight. To retain the pyrophorosity of the product the dissolution must be carried out under conditions which will prevent the deposition of oxide or nitride contaminants on the surface since these interfere with subsequent use of the catalyst for the purposes herein intended. They also eliminate the pyrophorosity of the catalyst, which while not an essential property of all catalysts in accordance with the present invention, is nonetheless a good indication of the catalytic activity of most of the materials embraced.

A convenient method of preparing the catalytic metals is to take an aluminum alloy of the metal such as aluminum-nickel, aluminum-cobalt, aluminum-titanium, aluminum-zirconium which may have an aluminum content of 10–90%, but more conveniently of approximately 25° Bé. solution of sodium hydroxide, the weight of said approximately 25° Bé. solution of sodium hydroxide being about 11 times that of the aluminum content of the sample to be treated. This may be done in a Pyrex flask or beaker or in a stainless steel vessel. The hydrogen liberated and the water vapor disengaged are ordinarily assumed to be sufficient to prevent access by air, oxygen or $CO_2$ to the metal surface formed, but I have found that metal so prepared is not sufficiently reactive to be useful in my process. I have therefore prepared the metal by dissolving out the aluminum from the appropriate aluminum alloy by the use of a solution of caustic soda which has been freed of oxygen by bubbling argon or helium or oxygen-free nitrogen through the hot solution and then carrying out the dissolution of the aluminum under a blanket of the same oxygen-free gases.

After the aluminum has been dissolved out the residual metal is washed thoroughly and repeatedly with hot distilled water which has been freed of oxygen by bubbling through it oxygen-free argon or helium or nitrogen. The washing is so conducted that access of air to the metal surface is completely prevented.

The metal surface so formed is highly active as a component of my catalyst system, but it must be rendered scrupulously dry as water or moisture completely destroys the activity of the catalyst system which is produced with the metal surface as one component. I have found that the most convenient method of drying the metal surface of the finely divided metal produced by treating the aluminum alloy with caustic soda solution followed by a scrupulously careful washing out of all water soluble components is to add an oxygen-free hydrocarbon solvent such as heptane, octane, decane, benzene, toluene, tetralin, etc. and to heat the system gently to boiling whereby water and solvent are distilled out, and to add solvent until the distillate is the completely anhydrous solvent without any trace of water. The solvent selected is the solvent in which it is desirable to carry out the subsequent polymerization reaction.

It will be noted that to ensure substantially complete removal of the undesired metal the contact with the dissolving agent should be of sufficient duration and the alloy particles should be subdivided. If either of these conditions does not exist, then the alloy particles will be affected only at the outside rather than throughout. While this is less efficient, the effect is that of having a porous metal structure on a solid support or carrier and only the outer structure which has the necessary ratio of surface to volume, will be catalytic. The interior of each particle will be inert.

The term "pyrophoric" as employed herein has reference to metals which will spontaneously react with the atmosphere and thus become ineffective for the purposes of the present invention. When the pyrophoric metal is produced by hydrogenation it is possible that greater or lesser quantities of the metal may be combined as hydrides admixed with the metals but this is not detrimental so long as oxygen is not available to form water and thus contaminate the catalyst.

The pyrophoric metals having effective surfaces in excess of 25 square meters per gram, whether prepared by reduction, deposition on a carrier or dissolution of an alloy, are thereafter rendered catalytically active by activation, possibly through complexing, with a metal hydride or a metal organic compound.

Suitable metals for the second component include aluminum, zinc, magnesium, and the alkali metals such as lithium, potassium and sodium. These metals must be present as hydrides, as alkyls, aryls, or, when the metal is polyvalent, as Grignard reagents combined with a halide atom and an organic radical such as an alkyl or aryl group. Representative organic metal compounds include trimethyl aluminum, triethyl aluminum, tripropyl aluminum, trioctyl aluminum, dimethyl zinc, diethyl zinc, dipropyl zinc, dimethyl magnesium, diethyl magnesium, dipropyl magnesium, lithium ethyl, lithium butyl, ethyl magnesium bromide, ethyl magnesium chloride, benzyl magnesium bromide, benzyl magnesium chloride, tolyl magnesium chloride, tolyl magnesium bromide, and the like. The fluorides and iodides can also be used as components of the Grignard reagents but the bromides are preferred, although the chlorides are quite satisfactory.

The activator can be present to the extent of only about 0.01 mole per mole of pyrophoric metal. Preferably for each effective mole of metal at least 0.1 mole of activator is employed. While there is no actual upper limit, little advantage is gained by increasing the mole ratio of activator to pyrophoric metal beyond 1.

The two components of the catalytically active system are brought together in an inert liquid such as a hydrocarbon, a halogenated hydrocarbon or an ether and are suspended therein by agitation. Suitable liquids include aliphatic hydrocarbons such as hexane, heptane, benzine, petroleum ether, and the like, cycloaliphatic hydrocarbons such as cyclohexane, decalin, and the like, aromatic hydrocarbons such as benzene, xylene, and the like, hydroaromatic compounds such as tetralin and the like, halogenated hydrocarbons such as carbon tetra-chloride, and the like, and ethers such as dioxane, and the like.

Vinyl monomers are then added to the suspension of the catalytically active system and the polymerization proceeds even at substantially atmospheric pressures. If desired the temperature may be elevated in order to accelerate the reaction. Gaseous olefins may be polymerized in this manner as well as normally liquid olefinic materials such as styrene, acrylates and other vinyl-type monomers.

I have also found that when the polymerization is carried out in a closed vessel or autoclave with agitation it is advantageous to add to the reaction mixture some highly polished small steel balls. These balls apparently exert a grinding effect on the particles of the metal or metal complex present thus causing fresh surfaces to be exposed constantly.

The use of a carrier or a porous metal permits the same effective surface to be attained as with powdered metal of less than 50 microns size. The larger particles are, however, more readily separated from the polymer reaction mass and thus simplify production on a commercial scale.

The following examples illustrate the preparation of the novel catalytically active system as well as their use in polymerizations:

Example I 5 grams of finely powdered iron oxalate were placed in a platinum boat which was inserted in a Pyrex glass tube which was placed in a suitable electrical furnace capable of being heated to 600° C. With the usual precautions of sweeping out air by passing nitrogen through the tube, the iron oxalate was then reduced by a stream of hydrogen at 375° C. for three hours. The product of reduction was finely divided iron (containing possibly also some iron hydride) of a gray color. When this material, after cooling in the tube under its atmosphere of hydrogen, was brought into contact with air it immediately began to glow with a bright red color and was oxidized to $Fe_2O_3$. A similar lot of material weighing two grams was transferred with suitable precautions out of contact with air to 50 ml. of air- and $H_2O$-free heptane under a blanket of dry nitrogen to a 3-necked flask of 250 ml. capacity provided with a mercury-sealed agitator and suitable connections. Then 0.5 gram of diethyl zinc in 10 ml. of heptane was added with constant agitation. There was a slight immediate rise in temperature, and the mixture was held at 50° C. The necessary connections were made and dry, air-free ethylene was bubbled in at the rate of about 50 ml. per minute at atmospheric pressure. After an induction period of about 10 minutes the ethylene was being visibly absorbed and a haze of gray solid polyethylene began to appear. The formation of solid continued for 8 hours and the flask was partly filled with a dark gray swollen gelatinous semi-solid mass of polymer and solvent which stopped the stirrer. The apparatus was disconnected and the contents of the flask were diluted with methanolic hydrogen chloride and transferred to a porcelain buchner funnel and washed with dilute methanolic hydrogen chloride until a sample of filtrate gave a negative test for iron. Then the solid which had gradually become lighter in color as the washing proceeded was thoroughly washed with methanol and dried in a vacuum oven at 40° C. for two hours. The product was 36.2 grams of a snow-white, odorless, light fluffy, powder. This polyethylene was found to have the following properties:

| | |
|---|---|
| Density | 0.947 |
| Melting point _____° C__ | 132.7 |
| Intrinsic viscosity [$\eta$] | 1.36 |
| Tensile strength at 25° C. _____p.s.i__ | 6850 |
| Impact strength at 25° C. | 28.9 |
| Flexural strength at 25° C. _____p.s.i__ | 6240 |
| Brittle point _____° C__ | −65 |
| Ash content _____p.p.m__ | 2.8 |
| Dielectric constant at $10^6$ cycles | 2.44 |
| Power factor at $10^6$ cycles | 0.0005 |

These data show the polymer obtained by the use of the pyrophoric iron and diethylzinc as the catalytically active system has extremely desirable properties as a plastic material for molding, casting, spinning and extrusion.

Example II

Using a procedure similar to that of Example I, 5 grams of nickel carbonate were reduced with hydrogen at 345° C. for two hours. The product was pyrophoric. The reduced product from 4 grams of nickel carbonate with the precautions indicated in the previous example was transferred with 100 ml. of dry, oxygen-free decalin to a 500 ml. stainless steel autoclave provided with a stirrer. The autoclave had previously been freed of air by flushing it with dry, oxygen-free nitrogen. 0.5 gram of lithium ethyl in 20 ml. of dry, oxygen-free decalin was added to the suspension of nickel in decalin with stirring and the temperature was then raised to 75° C. The system was then flushed with pure, dry ethylene, and then the ethylene pressure was raised to 10 atmospheres. At the end of 4 hours the pressure of ethylene had dropped to about 3 atmospheres, and fresh ethylene was admitted to raise the pressure to 10 atmospheres. The pressure was maintained at approximately 10 atmospheres for 16 additional hours by bleeding in ethylene from a small cylinder of the compressed gas. At the end of 20 hours, the charge was worked up as described in Example I. The product was 41 grams of almost pure white odorless polymer.

The properties were determined as in Example I and found to be:

| | |
|---|---|
| Density | 0.942 |
| Melting point _____° C__ | 131.8 |
| [$\eta$] | 1.17 |
| Tensile strength at 25° C. _____p.s.i__ | 6740 |
| Flexural strength at 25° C. _____p.s.i__ | 8860 |
| Brittle point _____° C__ | −68 |
| Ash content _____p.p.m__ | 4.9 |
| Dielectric constant at $10^6$ cycles | 2.51 |
| Power factor at $10^6$ cycles | 0.00046 |

Example III

Using the procedure of Example I, 2.4 grams of cobalt oxide were reduced with hydrogen at 480° C. for 3½ hours. A sample proved to be pyrophoric. The reduced product from the 2.4 grams of cobalt oxide was transferred to the autoclave with 100 ml. of dry, air-free octane and activated with 1.0 gram of ethyl magnesium bromide in 50 ml. of octane. The temperature was maintained at 50° C. and dry ethylene was passed in under 5 atmospheres pressure which was maintained constant over a period of 24 hours by further additions. When the product was worked up as before it was 37.4 grams of almost white, odorless polyethylene, having the following properties:

| | |
|---|---|
| Density | 0.951 |
| Melting point _____° C__ | 133.6 |
| [$\eta$] | 1.39 |
| Tensile strength at 25° C. _____p.s.i__ | 5950 |
| Flexural strength at 25° C. _____p.s.i__ | 9140 |
| Brittle point _____° C__ | −64.2 |
| Ash _____p.p.m__ | 7.6 |
| Dielectric constant at $10^6$ cycles | 2.51 |
| Power factor at $10^6$ cycles | 0.00061 |

Example IV 1.3 grams of ferric nitrate was reduced with hydrogen for 3 hours at 415° C. The gray product was pyrophoric. The reduced product from 1.3 grams of ferric nitrate was suspended in 100 ml. of dry, air-free tetralin, transferred to the autoclave and activated with 0.5 gram of aluminum triethyl in 20 ml. of dry tetralin. Dry, oxygen-free propylene was bubbled in at the rate of 50 ml. per minute for 3 hours. The product on working up as for polyethylene yielded 3.8 grams of almost white, odorless isotactic polypropylene with the following properties:

| | |
|---|---|
| Density | 0.926 |
| Melting point _____° C__ | 141 |
| [$\eta$] | 1:28 |
| Brittle point _____° C__ | −57 |
| Ash _____p.p.m__ | 6.4 |

The above properties characterize the polypropylene produced as a very valuable material for molding, casting, spinning and extrusion.

Example V 3.2 grams of very finely divided $Al_2O_3$ were suspended in a solution of 0.5 gram of nickel sulfate in 50 ml. of water. Dilute NaOH solution was added with vigorous stirring by a mechanical stirrer until all the nickel was precipitated from solution. The suspension was carefully filtered and washed with water until the washings were free of sulfate. The product was dried at 150° C. for 6 hours and then subjected to reduction by hydrogen as in Example I, namely 3 hours at 375° C. The product was a fine black powder which heated up spontaneously when exposed to air, showing that the deposited metal or metal hydride on the carrier was pyrophoric. 1.8 grams of the nickel-coated $Al_2O_3$ was suspended in 50 ml. of dry, oxygen-free heptane and transferred to the 3-necked flask under a blanket of dry nitrogen, and 0.25 gram of aluminum triisobutyl in 10 ml. of dry heptane was added with stirring. Then purified ethylene was bubbled through the heptane suspension for 6 hours and the product was worked up as indicated in Example I, and yielded 5.8 grams of white, odorless polyethylene powder with the following properties:

| | |
|---|---|
| Density | 0.952 |
| Melting point °C | 133.2 |
| [η] | 1.52 |
| Tensile strength at 25° C. p.s.i | 6480 |
| Flexural strength at 25° C. p.s.i | 8860 |
| Brittle point °C | −61.5 |
| Ash p.p.m | 15.6 |

*Example VI*

In this case 0.5 gram of platinum oxide was reduced by hydrogen under the conditions of Example I. The product was pyrophoric. The reduced material suspended in dry heptane was activated with diethyl zinc and used to polymerize ethylene at atmospheric pressure and 50° C. The product was worked up as in Example I. It was not further examined for its properties.

*Example VII*

This was carried out precisely like Example II, except that styrene monomer was used instead of ethylene. The polystyrene product was worked up similarly to the polyethylene. It was 19.5 grams of an almost white powder with the following properties:

| | |
|---|---|
| Density | 1.11 |
| Melting point °C | 118 |
| [η] | 1.65 |

An X-ray diagram taken with CuK radiation revealed that part of this material had crystalline areas as described by G. Natta for isotactic polystyrene.

While the procedures described in Example I to VII were carried out it was noticed that the activity of the reduced metal compounds decreased very rapidly as soon as the pyrophoric character was diminished or entirely eliminated by pretreatments with air, iodine or such organic oxidizing agents as nitro-compounds or peroxides. The more reactive the pyrophoric metal powder was to oxygen (air) the more catalytically active was it in combination with an activator as hereinabove set forth.

*Example VIII*

Aluminum-zirconium alloy pulverized to pass 140 mesh screen was converted to finely divided zirconium metal in the following manner: 50 grams of the powder was digested with 270 grams of a 25° Bé. sodium hydroxide solution. The caustic soda solution was placed in a 500 ml. flask provided with a slow speed mercury sealed stirrer with a stainless steel shaft and blade, a wide inlet tube for powder provided with a cork containing an argon feed tube, a reflux condenser with an outlet tube leading to a bubble counter containing sulfuric acid and protected by a safety bottle, and a draw-off tube reaching as nearly to the bottom of the flask as is possible. The system was flushed out with argon by passing oxygen-free argon through the argon inlet tube passing through the cork closing the powder feed tube. When enough argon had been passed through the system to completely displace the air, the cork was removed and a little alloy powder was added and the cork carrying the argon feed tube was replaced. Additional powder was added as subsiding of the foaming permitted until all the powder had been added. Then the suspension was digested for three hours just at the boiling point. Very little refluxing occurred. The suspension was allowed to cool, and oxygen-free water was added through the powder feed tube while argon still flowed in. The stirrer was stopped, and the supernatant liquid was sucked off by means of the draw-off tube using very gentle suction. The sludge was washed 20 times with about 350–400 ml. of air-free water with stirring after each addition of water. After 30 washes the wash solution drawn off was neutral. The wet sludge was then covered with oxygen-free n-heptane while argon was still bubbled through the flask. The reflux condenser was replaced by an overhead condenser and the flask was warmed to distill off heptane and water. From time to time heptane was added until the condensate was absolutely clear and then an additional 100 ml. of heptane was distilled over. The residue when the stirrer was stopped was a heavy sludge covered with pentane. The atmosphere in the flask was argon.

A one liter flask provided with a stirrer, thermometer, inlet and exit tube was flushed thoroughly with argon to displace the air.

By means of a special spoon with a deep bowl at right angles to the shaft a portion of the active metal covered with heptane was transferred quickly to the one liter flask. By visual estimation about one-tenth of the sludge or approximately 2.0–2.5 grams was thus transferred. 500 ml. of dry, oxygen-free heptane was added, and then dry oxygen-free ethylene was bubbled through the heptane with constant agitation. Then 15 grams of aluminum triethyl in 100 ml. of heptane was added. A slight rise in temperature occurred. The content of the flask was warmed to 75° C. and held at 70–80° C. for 12 hours while ethylene was passed through with constant agitation at the rate of 20 liters per hour. Absorption occurred and the solution or suspension gradually became milky. At the end of the 12 hours 100 ml. of methanolic hydrochloric acid was added, the total contents of the flask were added to a liter of methanol and the suspension filtered and washed on the filter with methanol. The cake was dried in vacuum overnight and a sample was dissolved in hot xylene to free it from inorganic components, cooled and precipitated by methanol to yield a snow white sample of polyethylene. Subjected to various tests it proved to be a linear polyethylene, specific gravity 0.947. The total yield was 42.7 grams.

*Example IX*

This was run exactly as in the case of Example VIII, except the polymerization of ethylene was carried out in a stainless steel autoclave of 1 liter capacity. The pressure was brought up to 15 atmospheres and the temperature was held at 70–80° C. for 12 hours while fresh ethylene was added hourly to keep the pressure at 15 atmospheres. The final yield of polyethylene was 121.5 grams of polyethylene of the same properties as in Example I.

*Example X*

This was run exactly as Example IX except that 8 polished steel balls about ½ inch in diameter were added to the autoclave and were rotated by the stirrer blade. The yield was 157.5 grams of polyethylene quite similar to that obtained in Examples VIII and IX.

*Example XI*

Finely divided zirconium was prepared from a 50% aluminum 50% zirconium alloy exactly as the finely divided titanium was prepared. A sample of approximately two grams was treated with aluminum triethyl exactly as in Example VIII and then used to polymerize ethylene in a flask at atmospheric pressure. Under the same conditions as in Example VIII there were obtained 27.9 grams of linear polyethylene of density 0.949.

*Example XII*

This was run under the conditions of Example X using the promoted zirconium catalyst. The yield was 85 grams of linear polyethylene of density 0.946.

Example XIII

This was run with the catalyst of Example VIII under the same conditions as Example VIII, but with propylene at about 15 liters (NTP) per hour. The yield was 36.1 grams of polypropylene. This was successively extracted with boiling acetone, boiling ether and boiling n-heptane. The residue was dissolved in hot toluene at 100° C. and filtered hot. The filtrate was cooled to 85° C. and diluted with n-propanol, and then cooled to 50° C. and filtered. The snow white solid was dried in vacuum at 70° C. It was 15.2 grams of isotactic polypropylene as evidenced by X-ray diffraction diagram, melting point 162° C., and density 0.91.

Example XIV

This was run exactly as Example X except that propylene was used instead of ethylene. The yield was 71.0 grams of polypropylene which by the extraction process of Example XIII yielded 32.2 grams of isotactic polypropylene.

Example XV

Active cobalt was prepared similarly to the active titanium of Example VIII. This was used as in Example VIII with aluminum triethyl in heptane to polymerize ethylene. The yield was 29.2 grams of a linear polyethylene with a specific gravity of 0.945.

Example XVI

This was run exactly as Example XV except that propylene was polymerized. The yield was 21.2 grams of polypropylene which when extracted by the procedure of Example XIII yielded 9.1 grams of isotactic polypropylene, melting point 161° C., density 0.91.

This case is a continuation-in-part of application Ser. No. 562,933, filed February 2, 1956, now pending.

Various changes and modifications may be made without departing from the spirit and scope of the present invention and it is intended that such obvious changes and modifications be embraced by the annexed claims.

What is claimed is:

1. A catalytically active system comprising a pyrophoric multivalent metal selected from the group consisting of the metals of groups IV, VI-B, and VIII of the periodic system having an effective surface of at least 25 square meters per gram, and about 0.01 to 1.0 mole of a metal compound as activator for each mole of pyrophoric metal, said metal compound being selected from the group consisting of metal hydrides, metal alkyls, metal aryls and Grignard reagents, the metal in said metal compound being selected from the group consisting of the metals of groups I-A, II and III-A of the periodic system.

2. The catalytically active system of claim 1, wherein the metal component is powdered and has an effective surface in excess of 25 square meters per gram.

3. The catalytically active system of claim 1, wherein the metal component is deposited on a porous carrier and has an effective surface in excess of 25 square meters per gram.

4. The catalytically active system of claim 1, wherein the metal component comprises a porous mass having an effective surface in excess of 25 square meters per gram.

5. A catalytically active system comprising a suspension in an inert organic liquid of a pyrophoric multivalent metal selected from the group consisting of the metals of groups IV, VI-B and VIII of the periodic system having an effective surface of at least 25 square meters per gram, and about 0.01 to 1.0 mole of a metal compound as activator for each mole of pyrophoric metal, said metal compound being selected from the group consisting of metal hydrides, metal alkyls, metal aryls and Grignard reagents, the metal in said metal compound being selected from the group consisting of the metals of groups I-A, II, and III-A of the periodic system.

6. A catalytically active system comprising a suspension in an inert organic liquid of porous titanium metal having an effective surface of at least 25 square meters per gram, and about 0.01 to 1.0 mole of a metal compound as activator for each mole of titanium metal, said metal compound being selected from the group consisting of metal hydrides, metal alkyls, metal aryls, and Grignard reagents, the metal in said metal compound being selected from the group consisting of the metals of groups I-A, II and III-A of the periodic system.

7. A catalytically active system comprising a suspension in an inert organic liquid of a pyrophoric multivalent metal of group VIII of the periodic system having an effective surface of at least 25 square meters per gram, and about 0.01 to 1.0 mole of a metal compound as activator for each mole of pyrophoric metal, said metal compound being selected from the group consisting of metal hydrides, metal alkyls, metal aryls and Grignard reagents, the metal in said metal compound being selected from the group consisting of the metals of groups I-A, II and III-A of the periodic system.

References Cited in the file of this patent

UNITED STATES PATENTS

| | | |
|---|---|---|
| 2,212,155 | Ellis | Aug. 20, 1940 |
| 2,773,053 | Field et al. | Dec. 4, 1956 |
| 2,781,410 | Ziegler et al. | Feb. 12, 1957 |
| 2,840,551 | Field et al. | June 24, 1958 |
| 2,931,792 | Aries | Apr. 5, 1960 |

FOREIGN PATENTS

| | | |
|---|---|---|
| 533,362 | Belgium | May 16, 1955 |